United States Patent [19]

DeVries et al.

[11] 4,136,040

[45] Jan. 23, 1979

[54] SOLID PARTICLES CONTAINING LUBRICATING OIL COMPOSITION AND METHOD FOR USING SAME

[75] Inventors: Donald L. DeVries, South Holland; James M. DeJovine, Homewood, both of Ill.

[73] Assignee: Atlantic Richfield Company, Philadelphia, Pa.

[21] Appl. No.: 893,101

[22] Filed: Apr. 3, 1978

Related U.S. Application Data

[63] Continuation-in-part of Ser. No. 752,225, Dec. 20, 1976, Pat. No. 4,094,799.

[51] Int. Cl.$^2$ .................. C10M 1/10; C10M 3/02; C10M 5/02; C10M 7/04
[52] U.S. Cl. ......................... 252/30; 252/25; 252/29; 251/51.5 A; 252/403
[58] Field of Search ............... 252/25, 30, 29, 51.5 A, 252/403

[56] References Cited

U.S. PATENT DOCUMENTS

| | | | |
|---|---|---|---|
| 3,384,580 | 5/1968 | Peace | 252/29 |
| 3,384,581 | 5/1968 | Peace | 252/30 |
| 3,702,300 | 11/1972 | Coleman | 252/51.5 A |
| 3,843,519 | 10/1974 | Bertrand | 252/30 |
| 3,956,149 | 5/1976 | Coleman | 252/51.5 A |
| 3,959,159 | 5/1976 | Coleman | 252/51.5 A |
| 4,039,337 | 8/1977 | Brown et al. | 252/29 |

*Primary Examiner*—Irving Vaughn
*Attorney, Agent, or Firm*—John B. Goodman

[57] ABSTRACT

An improved lubricating oil composition comprising a major amount by weight of oil of lubricating viscosity; a minor amount by weight of solid particles effective to improve the lubricating properties of the composition; and a minor amount of a nitrogen containing mixed ester of a carboxy containing interpolymer. This composition provides improved inhibition of sludge and varnish formation in use.

17 Claims, No Drawings

SOLID PARTICLES CONTAINING LUBRICATING OIL COMPOSITION AND METHOD FOR USING SAME

CROSS REFERENCE TO RELATED APPLICATION

This application is a continuation-in-part application of application Ser. No. 752,225, filed Dec. 20, 1976 U.S. Pat. No. 4,094,799; the teachings of which are incorporated by reference herein.

BACKGROUND OF THE INVENTION

This invention relates to improved lubricating oil compositions. More particularly, this invention relates to lubricating oil compositions which include solid materials to enhance the properties of such compositions.

Oil compositions are conventionally used to lubricate internal combustion engines, for example, such engines which power motor vehicles. Previous studies have indicated that the inclusion of certain solid materials, e.g., graphite, in these oil compositions improves the engine's fuel efficiency. For example, studies reported in "Stable Colloid Additives for Engine Oils — Potential Improvement in Fuel Economy", James E. Bennington et al, Society of Automotive Engineers, Fuels and Lubricants Meeting, Houston, Tex., June 3-5, 1975, indicate that a gasoline mileage improvement of between 3 to 5 percent is obtained by adding one percent graphite to a conventional lubricating oil composition. Such improvement in fuel economy is particularly valuable in view of, for example, the short supply of such fuels.

However, other criteria must be met by lubricating oil compositions in order to be effective in modern internal combustion engines. For example, such compositions are required to meet certain specifications with regard to tendency to form deposits, e.g., varnish, sludge and the like, on engine components. The presence of the solid lubricants in these compositions tends to increase these deposit forming tendencies.

A lubricating oil composition containing at least one of certain solid lubricants and having acceptable deposit forming characteristics is clearly desirable.

Therefore, one object of the present invention is to provide an improved lubricating oil composition.

Another object of this invention is to provide a solid particle-containing lubricating oil composition having reduced deposit forming tendency.

A still further object of the invention is to provide an improved method of lubricating an internal combustion engine. Other objects and advantages of the present invention will become apparent hereinafter.

SUMMARY OF THE INVENTION

An improved lubricating oil composition has now been developed. This composition comprises a major amount by weight of oil of lubricating viscosity; a minor amount by weight of solid particles effective to improve the lubricating properties of the composition; and a minor amount by weight of at least one of certain nitrogen containing mixed ester of a carboxy-containing interpolymer.

A preferred nitrogen containing mixed ester of a carboxy containing interpolymer is a polymer having a reduced specific viscosity in the range of about 0.05 to about 2, and being characterized by the presence within its polymeric structure of at least one of each of three pendant polar groups: (A) a relatively high molecular weight carboxylic ester group having at least about 8 aliphatic carbon atoms in the ester radical, (B) a relatively low molecular weight carboxylic ester group having no more than about 7 aliphatic carbon atoms in the ester radical, and (C) a carbonyl-polyamino group derived from at least one compound selected from the group consisting of (1) a polyamino compound having one primary or secondary amino group, (2) hydrazine or a hydrocarbon substituted hydrazine and (3) mixtures thereof. Preferably, the molar ratio of (A):(B):(C): is about (60–90):(10–30):(2–25), more preferably about (60–90):(10–30):(2–15).

More preferably, the present ester of a carboxy containing interpolymer is substantially free of titratable acidity.

The incorporation of such amounts of these interpolymer esters into the present solid particles containing compositions has been found to provide a surprising degree of reduction in detrimental deposit formulation, e.g., on internal combustion engine components lubricated by the present compositions.

DETAILED DESCRIPTION OF THE INVENTION

The oils used in the compositions of the present invention are those conventionally used in lubricant manufacture. The suitable lubricating oils include those having a viscosity within the range of about 50 SUS to about 2000 SUS at 100° F. These oils may be refined or otherwise processed to produce an oil having the desired quality. Although mineral oils are preferred, the oil may be synthetic in nature. The oil used in the present invention is preferably a mineral oil having a viscosity of about 100 SUS to about 1000 SUS at 100° F. Combinations of two or more different oils in a single lubricating composition are within the scope of the present invention. The lubricating oil comprises a major proportion preferably at least about 60 percent still more preferably at least about 70 percent, by weight of the total composition.

The present compositions include a minor amount by weight of solid particles effective to improve the lubricating properties of the compositions. Preferably, a major portion, by weight, and more preferably substantially all, of such solid particles, have a maximum transverse dimension in the range of about 1 millimicron to about 2 microns, and most preferably in the range of about 1 millimicron to about 1 micron. Suitable solid particles for use in the present invention include those materials known to provide improved lubricating properties to lubricating oil compositions. Such solid particles include, for example, graphite, molybdenum disulfide, zinc oxide, tungsten disulfide, mica, boron nitrate, borax silver sulfate, cadmium iodide, lead iodide, barium fluoride, tin sulfide, mixtures thereof and the like. The solid particles useful in the present compositions are preferably selected from the group consisting of graphite, molybdenum disulfide, zinc oxide, and mixtures thereof; more preferably from the group consisting of graphite, molybdenum disulfide and mixtures thereof; and most preferably, graphite.

The solid particles are preferably present in the present compositions in an amount of about 0.05% to about 5%, more preferably about 0.1% to about 2%, by weight of the total composition. The solid particles component of the present composition is preferably prepared as a colloidal suspension, in, for example, a conventional lubricating oil and/or at least one conventional lubricating oil detergent. For example, such colloidal suspensions or concentrates may contain about 2% to about 25% or more, by weight of such solid particles.

Any conventional lubricating oil detergent may be used to aid in stabilizing these colloidal suspensions of the presently useful solid particles. Such detergents are often characterized as comparing at least one surface active compound which, when included in a lubricating oil composition tends to inhibit solid contaminants, e.g., combustion by-products present in the engine's lubricating oil, from adhering to metallic surfaces of engine components. Although both ash-containing, metal-based detergents and ashless detergents are useful as such solid particles-containing suspension, the ashless detergents are preferred.

There are many examples of ash-containing, metal-based detergents which are suitable in such solid particles-containing suspension. The ashless detergents preferred for use are compounds which comprise an oil-solubilizing tail and a polar detergent head. Many ashless detergents fitting this general description are known to the art and are commercially available.

Specific examples of this type of ashless detergent include the polyamino-polyalkylene alkenyl succinimides. Amine salts of alkyl phosphoric acids, are also suitable. Polyamine derivatives of long chained hydrocarbons may also be used. Reaction products of alkylene polyamines with long chain alkenyl succinic anhydrides and long chain esters of Mannich bases are suitable detergents. As can be seen, the required polarity may be supplied by groups containing, for example, oxygen, sulfur, phosphorus, nitrogen and mixtures thereof. All of these suitable ashless detergents may be generally characterized as compounds comprising at least one substantially hydrocarbon portion of sufficient size to render the compound oil-soluble and at least one non-metallic polar portion which when attached to the hydrocarbon portion provides a substantial part, often essentially all, of the detergent action.

To illustrate, specific examples of ashless detergents suitable for use as solid particles stabilizers include polyaminepolyalkylene alkenyl succinimines, long chain polyamines, dihydrocarbon substituted polyamines, substituted-phenol substituted polyamine products and mixtures thereof. These compounds may be represented by the following structures:

Polyamine-Polyalkylene Alkenyl Succinimides

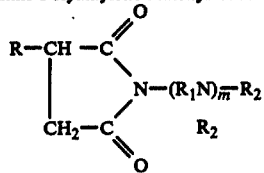

Long Chain Polyamines

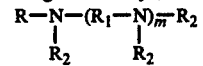

Dihydrocarbon Substituted Polyamines

-continued $$H-N-(R_1-N)_n N-H$$
$$\quad | \qquad\quad | \quad |$$
$$\;R_3 \qquad\;\; R_2\; R_3$$

Substituted Phenol-Substituted Polyamine Products

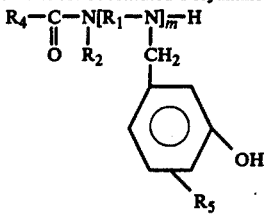

wherein R is a substantially hydrocarbon monovalent radical containing from about 30 to about 250 carbon atoms; each $R_1$ is an independently selected substantially hydrocarbon divalent radical containing from 1 to about 8 carbon atoms; each $R_2$ is independently selected from the group consisting of H and substantially hydrocarbon monovalent radicals containing from 1 to about 8 carbon atoms; each $R_2$ is an independently selected substantially hydrocarbon monovalent radical containing from about 15 to about 100 carbon atoms; $R_4$ is substantially hydrocarbon monovalent radical containing from about 4 to about 30 carbon atoms; m is an integer from 1 to about 10, preferably from 2 to about 10 and n is an integer from zero to about 10, preferably from about 2 to about 6.

It is preferred that R and $R_3$ be alkenyl, preferably selected from the group consisting of polypropenyl and polyisobutenyl. It is preferred that each $R_1$ be an independently selected alkylene radical containing from 1 to about 8, more preferably from 2 to about 6, carbon atoms. Suitable alkylene radicals from which each $R_1$ may be independently selected include methylene, ethylene, propylene, butylene, hexylene, octylene and the like. Although each $R_1$ may be independently selected, it is preferred that for any given ashless detergent all the $R_1$'s contained therein are the same radicals.

The substantially hydrocarbon monovalent radicals from which each $R_2$ may be independently selected each contain from 1 to about 8, preferably from 1 to about 4, carbon atoms. These substantially hydrocarbon radicals include alkyl, such as methyl, ethyl, propyl, butyl, hexyl, octyl and the like, alkenyl, such as ethenyl, propenyl, butenyl, hexenyl, octenyl and the like; aryl, alkaryl, aralkyl, alkenaryl and aralkenyl, such as phenyl, methyl phenyl, phenyl ethyl, ethenyl phenyl, phenyl ethenyl and the like.

The substantially hydrocarbon radicals from which $R_4$ is selected contain from 2 to about 30, preferably from about 4 to about 24, carbon atoms. These radicals may be straight chain or branched, saturated or unsaturated, aliphatic (including cycloaliphatic), aromatic or combinations thereof. Examples of suitable radicals include alkyl such as butyl, octyl, decyl, dodecyl, octadecyl, $C_{24}$ alkyl and the like; alkenyl such as butenyl, octenyl, dodecenyl, octydecenyl, $C_{24}$ alkenyl and the like; and aryl, alkaryl, aralkyl, alkenaryl, aralkenyl such as phenyl, benzyl, naphthyl, ethyl phenyl, decyl phenyl, octadecyl phenyl, phenyl butyl, phenyl decyl, phenyl octadecyl, butenyl phenyl, decenyl phenyl, octadecenyl phenyl, phenyl butenyl, phenyl decenyl, phenyl octadecenyl and the like. More preferably, $R_4$ is selected from the group consisting of alkyl and alkenyl containing from about 10 to about 24 carbon atoms.

Each $R_5$ is preferably independently selected from alkyl radicals containing from 4 to about 30, preferably from about 8 to about 20, carbon atoms. Examples of radicals from which each $R_5$ may be independently selected include amyl, octyl, decyl, octadecyl and the like. The

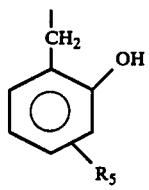

portion of the substituted phenol substituted polyamine acid salts may be replaced by, for example, alkylnaphthols and similar derivatives of biphenyl, terphenyl, phenanthrene, anthracene and the like.

The term "substantially" hydrocarbon radicals referred to herein includes those radicals which are composed primarily of carbon and hydrogen and also includes radicals which contain, in addition, minor amounts of substituents, such as oxygen, halide, sulfur, nitrogen and the like which do not substantially affect the hydrocarbon character of the radicals.

The specific ashless detergents noted above, as well as other of the many suitable ashless detergent materials and methods for preparing these materials are described in the following U.S. Pat. Nos. 3,237,614; 3,018,247; 3,513,093; 3,753,670; 3,008,993; 3,275,554; 3,473,011; 3,574,576; 3,576,743; 3,578,422; 3,597,174; 3,369,110; 3,652,240; 3,655,351; 3,658,494; 3,658,495; 3,676,089; 3,701,640; 3,711,255; 3,717,447; 3,728,091; 3,746,520; 3,751,255; 3,756,793; 3,762,889; 3,764,281; 3,765,850; 3,773,479; 3,752,657; 3,753,670; 3,779,724 and 3,782,912.

An additional essential component of the lubricating oil compositions of the invention is a minor amount, by weight, of at least one of certain nitrogen-containing esters of carboxy interpolymers. The preferred nitrogen-containing mixed ester of a carboxy-containing interpolymer is a polymer having a reduced specific viscosity of about 0.05 to about 2. The interpolymer is characterized by the presence with its polymeric structure carboxylic acid ester groups having at least 8 aliphatic carbon atoms in the ester radical. The preferred interpolymer is characterized by the presence within its polymeric structure of at least one of each of three pendant polar groups: (A) a relatively high molecular weight carboxylic ester group having at least 8 aliphatic carbon atoms in the ester radical, (B) a relatively low molecular weight carboxylic ester group having no more than 7 aliphatic carbon atoms in the ester radical, and (C) a carbonyl-polyamino group derived from a polyamino compound having one primary or secondary amino group, wherein the molar ratio of (A):(B):(C) is about (60–90):(10–30):(2–15)

It is preferred that the ester be a mixed ester, i.e., one in which there is the combined presence of both a high molecular weight ester group and a low molecular weight ester group, particularly in the ratio as stated above.

In reference to the size of the ester groups, the ester radical is represented by the formula

—C(O) (OR')

and the number of carbon atoms is an ester radical is thus the combined total of the carbon atom of the carbonyl group and the carbon atoms of the ester group, i.e., the (OR') group.

Another important element of the nitrogen-containing ester interpolymer is the presence of a carbonyl-polyamino group derived from at least one nitrogen-containing compound selected from the group consisting of (1) polyamino compound having one primary or secondary amino group, (2) hydrazine or a hydrocarbon-substituted hydrazine or (3) mixtures thereof.

Still another important element of the present invention is the extent of esterification in relation to the extent of neutralization of the unesterfied carboxy groups of the carboxy-containing interpolymer through the conversion thereof to polyamino-containing groups. For convenience, the relative proportions of the high molecular weight ester group to the low molecular weight ester group and to the polyamino group are expressed in terms of molar ratios of about (60–90):(10–30):(2–15), respectively. The more preferred ratio is about (70–80):(19–25):5. It should be noted that the linkage described as the carbonyl-polyamino group may be amide, imide, or amidine, and inasmuch as any such linkage is contemplated within the present invention, the term "carbonyl-polyamino" is employed to designate the amino group in defining the interpolymers employed in the compositions of this invention.

Still another important aspect of the mixed ester interpolymer is the molecular weight of the interpolymer. For convenience, the molecular weight is expressed in terms of the "reduced specific "viscosity" of the interpolymer which is a widely recognized means of expressing the molecular size of a polymeric substance. As used herein, the reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a solution of one gram of the interpolymer in 100 ml. of acetone and the viscosity of acetone at 30° ± 0.02° C. For purpose of computation by the above formula, the concentration is adjusted to 0.4 gram of the interpolymer per 100 ml. of acetone. A more detailed discussion of the reduced specific viscosity, also known as the specific viscosity, as well as its relationship to the average molecular weight of an interpolymer, appears in Paul J. Flory, Principles of Polymer Chemistry (1953 Edition) pages 308 et seq.

While interpolymers having a reduced specific viscosity in the range of about 0.05 to about 2 are contemplated for use in the present invention, the preferred interpolymers are those having a reduced specific viscosity in the range of about 0.3 to about 1. In most instances, interpolymers having a reduced specific viscosity in the range of about 0.5 to about 1 are particularly useful.

From the standpoint of utility, as well as for commercial and economical reasons, nitrogen-containing mixed esters in which the high molecular weight ester group has about from about 8 to about 24 aliphatic carbon atoms, the low molecular weight ester group has from about 3 to about 5 carbon atoms are preferred.

Specific examples of the high molecular weight carboxylic ester group, i.e., the (OR') group of the ester radical (i.e., —(O) (OR')) include heptyloxy, isooctyloxy, decyloxy, dodecyloxy, tridecyloxy, pentadecyloxy, octadecyloxy, eicosyloxy, tricosyloxy, tetracosyloxy, heptacosyloxy, triacontyloxy, hentriacontyloxy, tetracontyloxy, etc. Specific examples of low molecular weight groups include methyloxy, ethyloxy, n-propyloxy, isopropyloxy, n-butyloxy, see-butyloxy, iso-butyloxy, n-pentyloxy, neo-pentyloxy, n-henyloxy, cyclehexyloxy, cyclopentyloxy, 2-methy-butloxy, 2,3-dimethyl-butyl-1-oxy, etc. In most instances, alkoxy groups of suitable size comprise the preferred high and low molecular weight ester groups. Polar substituents may be present in such ester groups. Examples of polar substituents are chloro, bromo, ether, nitro, etc.

The carbonyl polyamino group of the nitrogen-containing esters of this invention comprise groups derived from (1) polyamino compounds having one primary or secondary amino group, and (2) hydrazine and/or hyrocarbon-substituted hydrazine.

Preferred polyamino compounds for forming these groups are primary-aminoalkyl substituted tertiary amines, hetercyclic amines are particularly preferred.

Examples of the carbonyl polyamino group include those derived from polyaminocompounds having one primary or secondary amino group and at least one monofunctional amino group such as tertiary-amino or heterocyclic amino group. Such compounds may thus be tertiary amino substituted primary or secondary amines or other substituted primary and secondary amines in which the substituent is derived from pyrroles, pyrrolidones, caprolactams, oxazolidones, oxazoles, thiazoles, pyrazoles, pyrazolines, imidazoles, imidazolines, thiazines, oxazines, diazines, oxycarbamyl, thiocarbamyl, uracils, hydantoins, thiohydantoins, guanidines, ureas, sulfonamides, phosphoramides, phenolthiazines, amidines, etc. Examples of such polyamino compounds include dimethyl-amino-ethylamine, dibutylamino-ethylamine,, 3-dimethyl-amino-1-propylamine, 4-methylethylamino-1-butylamine, pyridyl-ethlamine, N-morpholino-ethylamine, tatrahydropyridyl-ethlamine, bis-(dimethylamino) propylamine, bis-(diethylamino)ethylamine, N,N-dimethyl-p-phenylene di-amine, piperidyl-ethylamine, 1-aminoethyl pyrazone, 1-(methylamino)pyrazoline, 1-methyl-4-aminooctyl pyrazole, 1-aminobutyl imidazole, 4-aminoethyl thiazole, 2-aminoethyl triazine, dimethylcarbamyl propylamine, N-methyl-N-aminopropyl acetamide, N-aminoethyl succinimide, N-methylamino maleimide, N-aminobutyl-alpha-chlorosuccinimide, 3-aminoethyl uracil, 2-aminoethyl pyridine, orthy-aminoethyl-N,N-dimethylbenzenesulfamide, N-aminoethyl phenothiazine, N-aminoethylacetamidine, 1-aminophenyl-2-methyl-imidazoline, N-methyl-N-aminoethyl-S-ethyl-dithiocarbamate, etc. For the most part, the polyamines are those which contain only one primary amino or secondary-amino group and, preferably at least one tertiary-amino group. The tertiary-amino group is preferably a heterocyclic amino group. In some instances polyamino compounds may contain up to about 6 amino groups although, in most instances, they contain one primary amino group and either one or two tertiary-amino groups. The polyamino compounds may be aromatic or aliphatic amines and are preferably heterocyclic amines such as amino-alkyl-substituted morpholines, piperazines, pyridines, benzopyrroles, quinolines, pyrroles, etc. They are usually amines having from about 4 to about 30 carbon atoms, preferably from about 4 to about 12 carbon atoms. Polar substituents may likewise be present in the polyamines.

The carbonyl-polyamino groups of the nitrogen-containing esters of this invention can also comprise the groups derived from hydrazine and/or a hydrocarbon-substituted hydrazine including, for example, the mono-, di-, tri-, and tetrahydrocarbon-substituted hydrazines wherein the hydrocarbon substituent is either an aliphatic or aromatic substituent including, for example, the alkyl-, e.g., cyclic and/or acrylic groups, aryl-, alkylaryl-, aralkyl, etc. The hydrocarbon substituents, generally, contain up to about 24 aliphatic carbon atoms and preferably up to about 12 aliphatic carbon atoms. The preferred substituents, however, include, for example, phenyl, alkylphenyl or an alkyl group wherein the alkyl is either a methyl, ethyl, propyl, butyl, pentyl, octyl, cyclohexyl, decyl or dodecyl, etc. Other examples of the hydrocarbon groups include octyldecyl, behenyl, benzyl, heptaphenyl, $\alpha$-naphthyl, $\beta$-naphthyl, butyl-naphthyl, oleyl, stearyl, etc. Of the various hydrocarbon-substituted hydrazines, a preferred class includes the N,N-dihydrocarbon-substituted hydrazines, e.g., the dimethyl, diethyl, diphenyl and dibutyl hydrazines.

The carboxy-containing interpolymers include principally interpolymers of $\alpha, \beta$-unsaturated acids or anhydrides such as maleic anhydride or itaconic anhydride with olefins (aromatic or aliphatic) such as ethylene, propylene, styrene, or isobutene. The styrene-maleic anhydride interpolymers are especially useful. They are obtained by polymerizing equal molar amounts of styrene and maleic anhydride, with or without one or more additional interpolymerizable comonomers. In lieu of styrene, an aliphatic olefin may be used, such as ethylene, propylene, isobutene. In lieu of maleic anhydride, acrylic acid or methacrylic acid or ester thereof may be used. Such interpolymers are known in the art and need not be described in detail here. Where an interpolymerizable comonomer is contemplated, it should be present in a relatively minor proportion, e.g., less than about 0.3 mole, usually less than about 0.15 mole, per mole of either styrene or maleic anhydride. Various methods of interpolymerizing styrene and maleic anhydride are known in the art and need not be discussed in detail here. For purpose of illustration, the interpolymerizable comonomers include the vinyl monomers such as vinyl acetate, acrylonitrile, methyacrylate, methylmethacrylate, acrylic acid, vinyl methyl ether, vinyl ethyl ether, vinyl chloride, isobutene or the like.

The preferred nitrogen-containing mixed esters are most conveniently prepared by first esterifying the carboxycontaining interpolymer with a relatively high molecular weight alcohol and a relatively low molecular weight alcohol to convert at least about 50% and no more than about 98% of the carboxy radicals of the interpolymer to ester radicals and then neutralizing the remaining carboxy radicals with a polyamine such as described above. To incorporate the preferred amounts of the two alcohol groups into the interpolymer, the ratio of the high molecular weight alcohol to the low molecular weight alcohol used in the process should be within the range of about 2:1 to about 9:1 on a molar basis. In most instances the ratio is in the range of about 2.5:1 to about 5:1. More than one high molecular weight alcohol or low molecular weight alcohol may be used in the process; so also may be used commercial alcohol mixtures such as the so-called Oxo alcohols with comprise, for example, mixtures of alcohols having from 8 to about 24 carbon atoms. A particularly useful class of alcohols are the commercial alcohols or alcohol mixtures having at least 7 aliphatic carbon atoms including octyl alcohol, decyl alcohol, dodecyl alcohol, tetradecyl alcohol, pentadecyl alcohol, eicosyl alcohol, and octadecyl alcohol. Other alcohols useful in the process are illustrated by those which, upon esterification, yield the ester groups exemplified above.

The extent of esterification, as indicated previously, may range from about 50% to about 98% conversion of the carboxy radicals of the interpolymer to ester radicals to provide a partially esterified interpolymer. In a preferred embodiment, the degree of esterification ranges from about 75% to about 95%.

The esterification can be accomplished simply by heating the carboxy-containing interpolymer and the alcohol or alcohols under conditions typical for effecting esterification. Such conditions usually include, for example, a temperature of at least about 80° C., preferably from about 150° C. to about 350° C., provided that the temperature be below the decomposition point of the reaction mixture, and the removal of water of esterification as the reaction proceeds. Such conditions may optionally include the use of an excess of the alcohol reactant so as to facilitate esterification, the use of a solvent or diluent such as mineral oil, toluene, benzene, xylene or the like and an esterification catalyst such as toluene sulfonic acid, sulfuric acid, aluminum chloride, boron trifluoride-triethylamine, hydrochloric acid, ammonium sulfate, phosphoric acid, sodium methoxide or the like. The conditions and variations thereof are well known in the art.

A particularly desirable method of effecting mixed esterification involves first reacting the carboxy-containing interpolymer with the relatively high molecular weight alcohol and then reacting the partially esterified interpolymer with the relatively low molecular weight alcohol and then reacting the partially esterfied interpolymer with the relatively low molecular weight alcohol. A variation of this technique involves initiating the esterification with the relatively high molecular weight alcohol and before such esterification is complete, the relatively low molecular weight alcohol is introduced into the reaction mass so as to achieve a mixed esterification. In either event, a two-step esterification process whereby the carboxy-containing interpolymer is first esterified with the relatively high molecular weight alcohol so as to convert from about 50% to about 75% of the carboxy radicals to ester radicals and then with the relatively low molecular weight alcohol to achieve the finally desired degree of esterification provides preferred interpolymers.

The unesterified carboxylic radicals in the partially esterified interpolymer are then reacted with a nitrogen-containing compound; e.g., polyamino compound and/or hydrazine, to provide the nitrogen-containing esters of the invention.

For example, the esterified interpolymer can be treated with a polyamino compound in an amount so as to neutralize substantially all of the unesterfied carboxy radicals of the interpolymer. The neutralization is preferably carried out at a temperature of at least about 80° C., often from about 120° C. to about 300° C., provided that the temperature does not exceed the decomposition point of the reaction mass. In most instances the neutralization temperature is between about 150° C. and 250° C. A slight excess of the stoichiometric amount of the polyamino compound is often desirable, so as to insure substantial completion of neutralization, i.e., no more than about 2% of the carboxy radicals initially present in the interpolymer remained unneutralized and most preferably the resulting ester is substantially free of titratable acidity.

The unesterified carboxylic radicals can also be reacted with a small but effective amount of hydrazine or a hydrocarbon-substituted hydrazine to form the carbonylpolyamino group. The hydrazines may be used in the form of a hydrate, hydrohalide, sulfate, hydrosulfate, etc. The reaction with hydrazine or a hydrocarbon-substituted hydrazine proceeds suitably at temperatures ranging from about 80° to 300° C. The reaction temperatures may range from about 80° C. to 350° C. or higher provided that said temperature is maintained below the decomposition point of either the reactants or the products obtained thereof.

Thus, for example, at least about 50 mole percent, e.g., 50–98 mole percent, of the carboxyl groups of a sytrenemaleic interpolymer may be esterified with a high molecular weight aliphatic alcohol and then subsequently reacted with hydrazine, etc., to obtain a nitrogen-containing ester having about 2.0 to 50 or 2.0 to 35 molar percent of the carboxylic groups converted to carbonyl-polyamino groups. The alcohol-esterified interpolymer is preferably reacted with hydrazine or a hydrocarbon-substituted hydrazine to substantially neutralize all of the unesterified carboxy radicals of the interpolymer. The reaction with hydrazine is preferably carried out at temperatures ranging from about 100°–350° C. In most instances, however, the neutralization reaction takes place at temperatures ranging from about 150°–250° C. in the presence of an excess of the hydrazine. A stoichiometric excess is particularly useful where it is desirable to neutralize substantially all of the unesterified carboxy radicals present in the carboxy interpolymer.

Suitable nitrogen-containing esters of carboxy interpolymers are disclosed in U.S. Pat. Nos. 3,702,300; 3,956,149 and 3,959,159 incorporated by reference herein.

The compositions of the present invention preferably contain about 0.1 to about 12% by weight (based on the total composition) of at least one of the above-described interpolymers, more preferably, about 3% to about 10% by weight of the total composition. Preferably, the amount by weight of such polymers in the compositions of this invention is at least equal to the amount of solid particles, e.g., graphite, molybdenum disulfide and the like, present. More preferably, the amount of interpolymer is at least about 2 times, still more preferably at least about 3 times, the amount of solid particles.

The compositions of the present invention possess the advantageous combination of a high degree of effectiveness with respect to lubricity, dispersant-detergent properties, pour-point depressing action and viscosity index improvements. Further, the present compositions provide for improved fuel economy and reduced tendency to form deposits.

In addition to the components already described herein, lubricating compositions contemplated herein can contain conventional adjuvants, such as, for example, anti-oxidants, metal deactivators, pour point depressants, oiliness agents, blooming agents, peptizing agents, and the like.

The lubricating compositions of the present invention may be prepared in any conventional manner. For example, the various components may be brought together and blended at a slightly elevated temperature, i.e., about 100 to 130° F., to insure a uniform composition.

In many instances, the additives incorporated into the present lubricating compositions are available as a mixture in a mineral oil or other solvent carrier. Unless otherwise noted, the weight proportions given above refer to the amount of additive material on a carrier or solvent free basis.

The lubricating compositions of the present invention can be used to lubricate internal combustion engines. Maintaining (or causing to be maintained) a lubricating amount of the lubricating compositions of the present invention on the components of such internal combustion engine requiring lubrication, results in obtaining substantial benefits from the present invention.

The following examples illustrate clearly the present invention. However, these examples are not to be interpreted as specific limitations on the invention.

EXAMPLES 1–4

The following examples illustrate certain of the outstanding benefits of the present invention.

A series of four lubricating oil compositions were prepared by blending together individual components, noted below, at a slightly elevated temperature, i.e., about 100° F. to about 130° F., to insure proper mixing. The final compositions were as follows:

| Component, Wt.% | Example 1 | 2 | 3 | 4 |
|---|---|---|---|---|
| Mineral Oil, 125 SUS at 100° F. | 84.0 | 74.7 | 74.2 | 74.2 |
| Conventional Additive Mixture[1] | 7.4 | 7.5 | 7.5 | 7.5 |
| Methacrylate Polymer[2] | 8.6 | 7.8 | — | — |
| Nitrogen-containing interpolymer[3] | — | — | 8.3 | — |
| Nitrogen-containing interpolymer[4] | — | — | — | 8.3 |
| Graphite Dispersion[5] | — | 10.0 | 10.0 | 10.0 |

Each of these lubricating oil compositions identified in Examples 1 and 2 was used to lubricate an internal combustion engine which, in turn, was operated through a Reference Sequence VC Test. This test, in which the engine is operated for 192 hours, is described in "Multicylinder Test Sequences for Evaluating Automotive Engine Oils — ASTM Special Technical Publication 315F", American Society for Testing and Materials (1973). This procedure is known to produce data which can be used to make valid comparisons of the effects various lubricating oil compositions have on engine sludge and varnish ratings under normal operating conditions.

Sludge and varnish ratings in the Referance Sequence VC Test are based upon visual inspection of various engine components and comparison with a series of CRC reference standards.

Results of this test using each of the above-described lubricating compositions are summarized below. For comparison purposes, miminum SE standard lubricating oil qualification ratings are also presented.

| REFERENCE SEQUENCE VC RESULTS | COMPOSITION 1 | 2 | SE MINIMUM RATINGS |
|---|---|---|---|
| Average Overall Sludge Rating | 8.7 | 8.1 | 8.5 |
| Average Overall Varnish Rating | 8.3 | 7.8 | 8.0 |
| Piston Skirt | 8.3 | 8.0 | 7.9 |

The above data indicate that compositions which include solid particles cause a substantial decrease in sludge and varnish ratings (increase in sludge and varnish formation). This conclusion is apparent by comparing the results from Composition 2 with those from the non-graphite containing Composition 1. Thus, the inclusion of the conventional viscosity index improver, which provides adequate sludge and varnish formation protection (see Example 1) when included in a composition without solid particles, fails to meet the SE qualification standards when such solid particles are added.

The Sequence VC Test described in Examples 1 and 2 illustrate the problems in formulating a suitable solids particles-containing lubricating composition. Examples 3 and 4 are lubricating oil composition in accordance with the invention. These lubricating compositions containing graphite and nitrogen containing esters of carboxy-containing interpolymers of the invention provide reduced sludge and varnish deposition relative to lubricating compositions not containing these interpolymers, and are illustrative of the improved solids containing lubricating compositions of the invention.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A composition of matter comprising a major amount by weight of oil of lubricating viscosity; a minor amount by weight of solid particles effective to improve the lubricating properties of said composition; and a minor amount by weight of at least one nitrogen-containing ester of a carboxy containing interpolymer present in an amount effective to reduce the deposit forming tendencies of said composition, said carboxy-containing interpolymer being interpolymer of α,β-unsaturated acids or anhydrides with olefins having a reduced specific viscosity of from about 0.05 to about 2, said carboxy containing interpolymer having carboxylic ester groups having at least 8 carbon atoms, and carbonyl-amino groups.

2. The composition of claim 1 wherein a major portion of said solid particles have a maximum transverse dimension in the range of about 1 millimicron to about 2 microns.

3. The composition of claim 2 wherein said solid particles are selected from the gorup consisting of graphite, molybdenum disulfide, zinc oxide and mixtures thereof, said solid particles are present in an amount of about 0.05% to about 5% by weight of the total composition and said the nitrogen-containing ester of the carboxy interpolymer is present in an amount of about 2% to about 12% by weight of the total composition.

4. The composition of claim 2 wherein said the nitrogen-containing ester of the carboxy interpolymer is present in an amount of at least to the amount of said solid particles.

5. The composition according to claim 1 wherein the nitrogen-containing ester of the carboxy interpolymer is a mixed ester of a carboxy containing interpolymer, said ester being substantially free of titratable acidity and being characterized by the presence within its polymeric structure of at least one of each of three pendant polar groups: (A) a relatively high molecular weight carboxylic ester group having at least 8 aliphatic carbon atoms in the ester radical, (B) a relatively low molecular weight carboxylic ester group having no more than 7 aliphatic carbon atoms in the ester radical, and (C) a carbonyl-polyamino group derived from a polyamino compound having one primary or secondary amino group, wherein the molar ratio of (A):(B):(C) is (60–90):(10–30):(2–15).

6. The composition according to claim 5 wherein the carbonyl polyamino group is derived from polyamino compound having one primary or secondary amino group and at least one monofunctional amino group.

7. The composition according to claim 6 wherein said monofunctional amino group is a tertiary amino or heterocyclic amino group.

8. The composition according to claim 7 wherein said amino group is derived from aminoethyl morpholine or aminopropyl morpholine.

9. The composition according to claim 5 wherein said carbonyl polyamino groups are derived from hydrazine or a hydrocarbon-substituted hydrazine.

10. The composition of any one of claims 1–9 wherein said solid particles are graphite and molybdenum disulfide.

11. The composition of claim 1 wherein said solid particles are present in an amount of about 0.1% to about 12% by weight of the total composition and the nitrogen-containing ester of the carboxy interpolymer is present in an amount of about 3% to about 10% by weight of the total composition.

12. The composition of claim 1 wherein the nitrogen-containing ester of the carboxy interpolymer is present in an amount of at least about 2.5 times the amount of said solid particles.

13. The composition of claim 1 wherein the nitrogen-containing ester of the carboxy interpolymer is present in an amount of at least 3 times the amount of said graphite.

14. A method of lubricating an internal combustion engine comprising components requiring lubrication which comprises maintaining a lubricating amount of the composition of claim 1 on components of said engine requiring lubrication.

15. The composition of claim 5 wherein a method of lubricating an internal combustion engine comprising components requiring lubrication which comprises maintaining a lubricating amount of the composition of claim 1 on components of said engine requiring lubrication.

16. The composition of claim 5 wherein the interpolymer is an interpolymer of styrene and maleic acid or anhydride thereof.

17. The composition of claim 5 wherein the interpolymer has a reduced specific viscosity the range of about 0.3 to about 1.

* * * * *

UNITED STATES PATENT AND TRADEMARK OFFICE
CERTIFICATE OF CORRECTION

PATENT NO. : 4,136,040
DATED : January 23, 1979
INVENTOR(S) : Donald L. DeVries and James M. DeJovine It is certified that error appears in the above-identified patent and that said Letters Patent are hereby corrected as shown below:

Column 12, line 61, delete the word "gorup" and insert in place thereof --group--.

line 65, delete the word "the".

13, line 1, delete after the phrase "wherein said", delete the word --the--.

Signed and Sealed this

First Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,136,040
DATED : January 23, 1979
INVENTOR(S) : Donald L. DeVries
James M. DeJovine It is certified that error appears in the above-identified patent and that said Letters Patent are hereby corrected as shown below:

Column 1, line 48, delete the words "particle-containing" and insert in place thereof -- particles-containing --.

Column 3, line 15, delete the word "comparing" and insert in place thereof -- comprising --.

Column 5, line 31, delete the number "3,237,614" and insert in place thereof -- 3,273,614 --.

Column 11, line 45, (after the table) insert the following:

(1) This mixture is a commercially available combination of materials each of which is conventionally used in lubricating oil compositions. This mixture includes alkyl zinc dithiophosphate, both overbased and neutral calcium sulfonates, calcium phosphonatephenate and both an ashless dispersant and an ashless rust inhibitor. This mixture also included about 50% by weight of a light mineral oil as solvent for the active ingredients.

(2) A commercially available methacrylate polymer known and conventionally used to improve the viscosity index of lubricating oil polymers. Such polymer includes essentially no N-vinyl pyrrolidone. The material as used includes about 50% by weight of a mineral oil as solvent for the polymer. The polymer is believed to have an average molecular weight of about 800,000 and to be derived from a methacrylic ester containing about 16 carbon atoms per molecule.

UNITED STATES PATENT AND TRADEMARK OFFICE
CERTIFICATE OF CORRECTION

PATENT NO. : 4,136,040

DATED : January 23, 1979

INVENTOR(S) : Donald L. DeVries
James M. DeJovine

It is certified that error appears in the above-identified patent and that said Letters Patent are hereby corrected as shown below:

(3) A styrene maleic interpolymer is obtained by preparing a solution of styrene (16.3 parts by weight) and maleic anhydride (12.9 parts) in a benzene-toluene solution (270 parts; weight ratio of benzene:toluene being 66.5:33.5) and contacting the solution at 86°C. in nitrogen atmosphere for 8 hours with a catalyst solution prepared by dissolving 70% benzoyl peroxide (0.42) part in a similar benzene-toluene mixture (2.7 parts). The resulting product is a thick slurry of the interpolymer in the solvent mixture. A mineral oil (141 parts) is added to the slurry while the solvent mixture is being distilled off at 150°C. and then at 150°C./200 mm. Hg. To 209 parts of the stripped mineral oil-interpolymer slurry (the interpolymer having a reduced specific viscosity of 0.72) there are added toluene (25.2 parts), n-butyl alcohol (4.8 parts) a commercial alcohol consisting essentially of primary alcohols having from 12 to 18 carbon atoms (55.6 parts) and a commercial alcohol consisting of primary alcohols having from 8 to 10 carbon atoms (10 parts) and to the resulting mixture there is added 96% sulfuric acid (2.3 parts). The mixture is then heated at 150°-160°C. for 20 hours whereupon water is distilled off. An additional amount of sulfuric acid (0.18 part) together with an additional amount of n-butyl alcohol (3 parts) is added and the esterification is continued until 95% of the carboxy radicals of the polymer has been esterified. To the esterified interpolymer, there is then added aminopropyl morpholine (3.71 parts; 10% in excess of the stoichiometric amount required to neutralize the remaining free carboxy radicals) and the resulting mixture is heated to 150°-160°C./10 mm. Hg to distill off toluene and any other volatile components. The stripped product is mixed with an additional amount of mineral oil (12 parts) and filtered. The filtrate is a mineral oil solution of the nitrogen-containing mixed ester having a nitrogen content of 0.16-0.17%.

UNITED STATES PATENT AND TRADEMARK OFFICE
CERTIFICATE OF CORRECTION

PATENT NO. : 4,136,040

DATED : January 23, 1979

INVENTOR(S) : Donald L. DeVries
James M. DeJovine

It is certified that error appears in the above-identified patent and that said Letters Patent are hereby corrected as shown below:

(4) A carboxy interpolymer is obtained by preparing a solution of styrene (16.3 parts by weight) and maleic anhydride (12.9 parts by weight) in a benzene-toluene solution (270 parts; weight ratio of benzene to toluene being 66.5 to 33.5) and contacting the solution at 86°C. in nitrogen atmosphere for 8 hours with a catalyst solution prepared by dissolving 70% benzoyl peroxide (0.42 part by weight) in similar benzene-toluene mixture (2.7 parts by weight). The resulting product is a thick slurry of the interpolymer in the solvent mixture. To the slurry there is added mineral oil (141 parts by weight) while the solvent mixture is being distilled off at 150°C. and then at 150°C./200 mm Hg. To 209 parts by weight of the stripped mineral oil-interpolymer slurry (the interpolymer having a reduced specific viscosity of 0.72) there are added toluene (25.2 parts by weight), n-butyl alcohol (4.8 parts by weight), a commercial alcohol consisting essentially of primary alcohols having from 12 to 18 carbon atoms (56.6 parts by weight) and a commercial alcohol consisting of primary alcohols having from 8 to 10 carbon atoms (10 parts by weight) and to the resulting mixture there is added 96% sulfuric acid (2.3 parts by weight). The mixture is then heated at 150°-160°C. for 20 hours whereupon water is distilled off. An additional amount of sulfuric acid (0.18 part by weight) together with an additional amount of n-butyl alcohol (3.0 parts by weight) is added and the esterificiation is continued until 95% of the carboxy radicals of the polymer has been esterified. To the esterified interpolymer (400 parts by weight), there is then added hydrazine (64% aqueous solution) (2.7 parts by weight) and the resulting mixture is heated to 150°C. and then to 150°C./100 mm Hg. to distill off volatile components. The stripped product is mixed with mineral oil (126 parts by weight) and filtered. The filtrate is a mineral oil solution of the nitrogen-containing ester.

UNITED STATES PATENT AND TRADEMARK OFFICE
CERTIFICATE OF CORRECTION

PATENT NO. : 4,136,040

DATED : January 23, 1979

INVENTOR(S) : Donald L. DeVries
James M. DeJovine

It is certified that error appears in the above-identified patent and that said Letters Patent are hereby corrected as shown below:

(5) A mineral oil-based dispersion containing about 10% by weight of solid graphite particles which have an average (by weight) particle size of about 200 millimicrons. The dispersion also includes about 6% of a nitrogen and methacrylate-containing dispersant to aid in maintaining dispersion stability. This dispersant is believed to be derived from a methacrylic ester containing about 16 carbon atoms per molecule.

UNITED STATES PATENT AND TRADEMARK OFFICE
CERTIFICATE OF CORRECTION

PATENT NO. : 4,136,040

DATED : January 23, 1979

INVENTOR(S) : Donald L. DeVries
James M. DeJovine

It is certified that error appears in the above-identified patent and that said Letters Patent are hereby corrected as shown below:

Column 6, line 4, delete the word "is" (first occurrence), and insert in place thereof -- in --.

line 17, delete the word "unesterfied" and insert in place thereof -- unesterified --.

line 24, after the number "30" and before the colon, insert a left parenthesis -- ) --.

Column 7, line 26, delete the word "hetercyclic" and insert in place thereof -- heterocyclic --.

Column 9, line 2, delete the word "with" and insert in place thereof -- which --.

line 63, delete the word "unesterfied" and insert in place thereof -- unesterified --.

Column 10, line 23, delete the word "sytrenemaleic" and insert in place thereof -- styrene maleic --.

Column 11, line 61, delete the word "Referance" and insert in place thereof -- Reference --.

Signed and Sealed this

Thirty-first Day of July 1979

[SEAL]

Attest:

LUTRELLE F. PARKER

Attesting Officer    Acting Commissioner of Patents and Trademarks